(12) United States Patent
Tur

(10) Patent No.: US 12,115,741 B2
(45) Date of Patent: Oct. 15, 2024

(54) TWO-PART BAG SEAL

(71) Applicant: MAGNUM VENUS PRODUCTS, INC., Knoxville, TN (US)

(72) Inventor: Charles Tur, Les Vastres (FR)

(73) Assignee: Magnum Venus Products, Inc., Knoxville, TN (US)

( * ) Notice: Subject to any disclaimer, the term of this patent is extended or adjusted under 35 U.S.C. 154(b) by 0 days.

(21) Appl. No.: 17/663,713

(22) Filed: May 17, 2022

(65) Prior Publication Data
US 2023/0373171 A1    Nov. 23, 2023

(51) Int. Cl.
*B29C 70/00* (2006.01)
*B29C 70/44* (2006.01)
*B29C 70/54* (2006.01)

(52) U.S. Cl.
CPC ............ *B29C 70/544* (2021.05); *B29C 70/44* (2013.01)

(58) Field of Classification Search
None
See application file for complete search history.

(56) References Cited

U.S. PATENT DOCUMENTS

| 4,724,113 | A | | 2/1988 | Lee |
| 5,181,946 | A | * | 1/1993 | Bosses ...................... A47L 9/14 |
| | | | | 55/382 |
| D845,762 | S | * | 4/2019 | Felsenthal ...................... D9/435 |
| 10,751,956 | B2 | | 8/2020 | Gu et al. |
| 2005/0244083 | A1 | * | 11/2005 | McMahon et al. ......................... |
| | | | | B65D 81/2038 |
| 2006/0006599 | A1 | * | 1/2006 | Shahidi ............... B29C 33/0038 |
| | | | | 277/312 |
| 2007/0296126 | A1 | | 12/2007 | Audette |
| 2011/0110612 | A1 | * | 5/2011 | Nelson .................... B29C 70/54 |
| | | | | 383/42 |
| 2012/0181210 | A1 | | 7/2012 | Shi |
| 2014/0048205 | A1 | | 2/2014 | Balas |
| 2014/0050813 | A1 | * | 2/2014 | Balas .................. B29C 37/0089 |
| | | | | 425/388 |
| 2018/0340439 | A1 | * | 11/2018 | Vinski .................... F01D 25/16 |

\* cited by examiner

*Primary Examiner* — Nicholas R Krasnow
(74) *Attorney, Agent, or Firm* — Luedeka Neely, P.C.

(57) ABSTRACT

A two-part bag seal and a method for sealing a vacuum bag to a mold for a molding process. The two-part bag seal includes an elongate first seal part having a cross-sectional portion enclosing an open channel therein, and an angled cross-sectional portion having an open receptacle channel therein, and an elongate second seal part having a flexible wing portion and a flexible prong distal from the flexible wing portion, wherein the flexible prong is engageable with the open receptacle channel of the elongate first seal part.

15 Claims, 6 Drawing Sheets

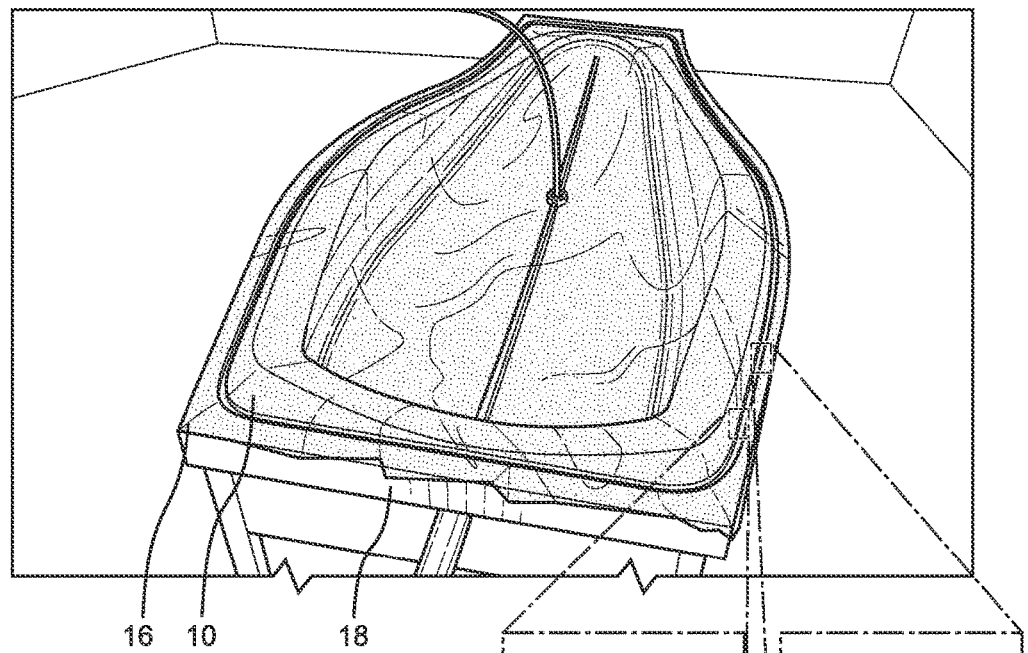
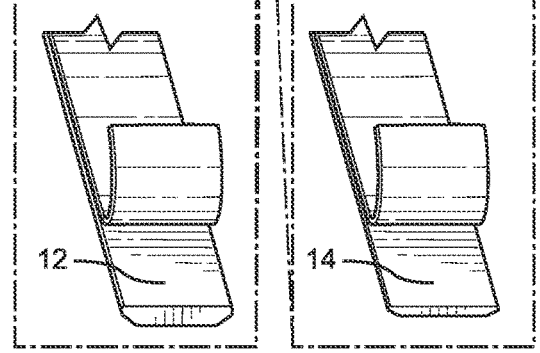
FIG. 1
*PRIOR ART*
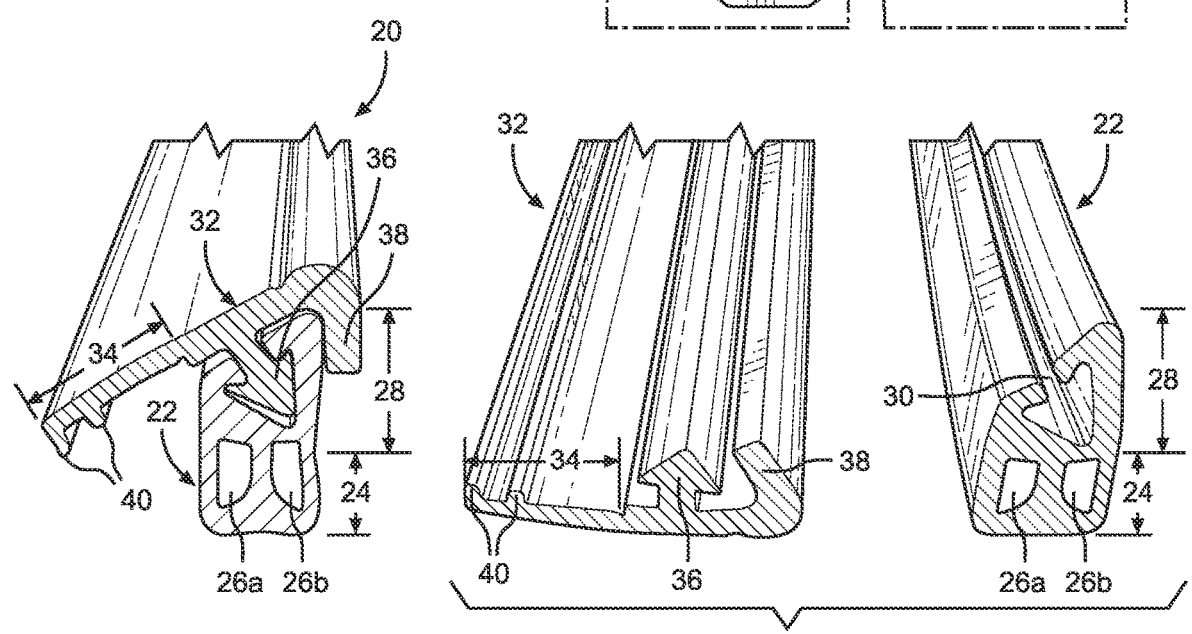
FIG. 2　　　　　　FIG. 3

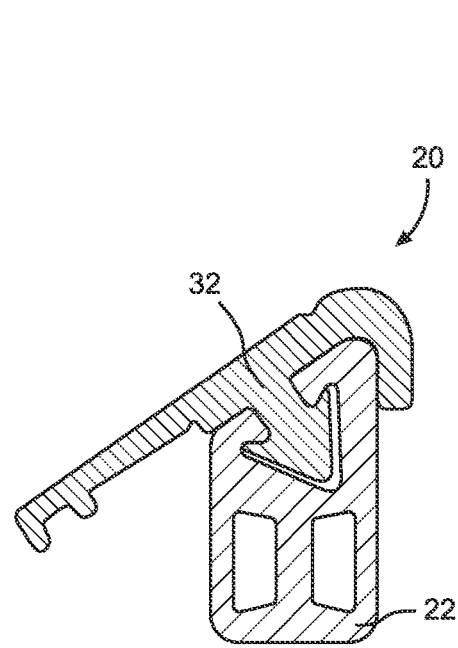 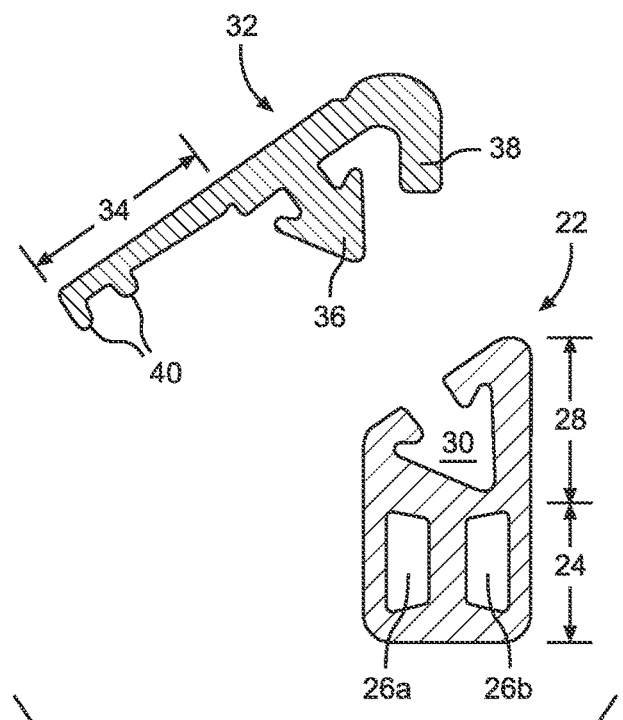
FIG. 4  FIG. 5
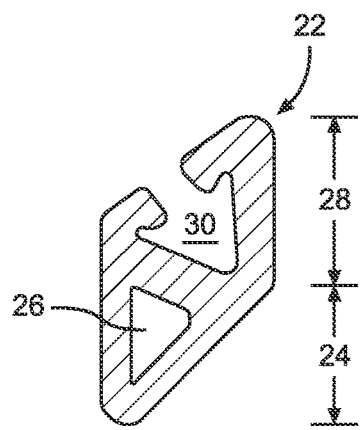 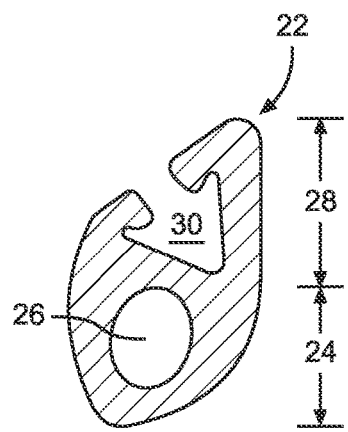
FIG. 6  FIG. 7

TWO-PART BAG SEAL

TECHNICAL FIELD

The disclosure is directed to a two-part bag seal capable of sealing the edge of a vacuum bag used in an infusion molding process and for a method of using the two-part bag seal for sealing the edge of a vacuum bag used in an infusion molding process.

BACKGROUND AND SUMMARY

Infusion molding processes for relatively large parts such as boat hulls, swimming pools, and the like, typically use a flexible film, or bag, to enclose the parts. A vacuum is drawn on the vacuum bag on one side of the part and atmospheric pressure compresses the part from the other side during a curing step. The vacuum bag is sealed to the mold along the edges of the mold surface to enclose the part in an air-tight arrangement with respect to the mold. The lower mold is a rigid structure and the upper surface of the part is formed by the vacuum bag that forms a flexible membrane. A vacuum is drawn on the part and held while the part is cured.

Vacuum bagging is widely used in the composite resin infusion molding industry. Carbon fiber fabric and fiberglass fabric may be infused with resins or epoxies in a vacuum bagging operation. Infusion molding is used to transfer resin from one area of a part being manufactured to another area. Infusion molding also may be used to consolidate laminated layers by removing entrapped air. The vacuum bag, as previously described, may be used to form a vacuum chamber in combination with the mold.

The vacuum bag must be sealed around the perimeter of the mold in order to pull a vacuum on the infusion molding system. Conventional seals for vacuum bags 10 around the perimeter of the mold include the use of a tack tape 12 or 14 between a flange 16 of the mold 18 and the vacuum bag 10 as shown in FIG. 1. The type of tack tape 12 or 14 used depends on the type of vacuum bag 10 being used for the molding process. FIG. 1 illustrates an infusion molding process for a boat hull using a conventional tack tape 12 or 14 for sealing the vacuum bag 10 to the mold 18.

While the use of a tack tape 12 or 14 may be suitable for relatively small molds, it is difficult to get a sufficient, leak-tight seal between the vacuum bag and the flange on large molds used for infusion molding. Accordingly, what is needed is an improved vacuum bag seal for an infusion molding process that eliminates the use of tack tape.

With regard to the foregoing, embodiments of the disclosure provide a two-part bag seal and a method for sealing a vacuum bag to a mold for a molding process. The two-part bag seal includes an elongate first seal part having a cross-sectional portion enclosing an open channel therein, and an angled cross-sectional portion having an open receptacle channel therein, and an elongate second seal part having a flexible wing portion and a flexible prong distal from the flexible wing portion, wherein the flexible prong is engageable with the open receptacle channel of the elongate first seal part.

In some embodiments, the cross-sectional portion enclosing the open channel includes one or more chambers.

In some embodiments, the open receptacle channel is an arrowhead-shaped cross-sectional channel.

In some embodiments, the flexible prong is an arrowhead-shaped prong. In other embodiments, a flexible hook-shaped end is provided adjacent to the flexible prong for engaging the angled cross-sectional portion of the elongate first seal part.

In some embodiments, the flexible wing portion of the elongate second seal part includes one or more flexible nubs thereon for engaging the mold flange. In other embodiments, the one or more flexible nubs are on a same side of the elongate second seal part as the flexible prong.

In some embodiments, the two-part bag seal includes at least one pressure port for inflating the chamber of the elongate first seal part with a gas.

In some embodiments, the cross-sectional portion enclosing the chamber is a rectangular cross-sectional portion. In other embodiments, the cross-sectional portion enclosing the chamber is a rounded or oval cross-sectional portion.

In some embodiments, there is provided a method for sealing a vacuum bag to a mold for molding of a part. The method includes providing a two-part bag seal having an elongate first seal part having a rectangular cross-sectional portion enclosing a chamber therein, and an angled cross-sectional portion having an open receptacle channel therein, and an elongate second seal part having a flexible wing portion and a flexible prong distal from the flexible wing portion, wherein the flexible prong is engageable with the open receptacle channel of the elongate first seal part. The elongate first seal part and a vacuum bag is inserted into a groove in a mold flange around a perimeter of the mold. The flexible prong of the elongate second seal part is inserted into the open receptacle channel of the first seal part. The chamber of the elongate first seal part is, optionally, inflated with a gas, such as to form an air-tight seal around the perimeter of the mold.

In some embodiments, the mold flange has a first vacuum port therein disposed between one or more flexible nubs on the flexible wing portion of the elongate second seal part and the groove in the mold flange, and a vacuum is applied to the first vacuum port to seal the flexible wing portion to the mold flange.

In some embodiments, the groove in the mold flange has a second vacuum port therein, and a vacuum is applied to the second vacuum port to seal the vacuum bag to the mold.

An advantage of the two-part bag seal is that the seal is easy to assemble into a groove in a flange of a mold and can be inflated to prevent air leakage into the evacuated area of the mold. The two-part bag seal also contains a flexible wing on the second part of the seal to further seal a top side of the mold flange against air leakage. Other benefits and advantages of the two-part bag seal may be evident by reference to the following drawings and detailed description of embodiments of the disclosure.

BRIEF DESCRIPTION OF THE DRAWINGS

FIG. 1 is a perspective view, not to scale of a prior art process for infusion molding using conventional tack tape to seal a vacuum bag to a mold.

FIGS. 2 and 3 are partial perspective views of a two-part bag seal according to an embodiment of the disclosure.

FIGS. 4-7 are cross-sectional views of the two-part bag seal according to embodiments of the disclosure.

DETAILED DESCRIPTION OF EMBODIMENTS OF THE DISCLOSURE

Figure 8:
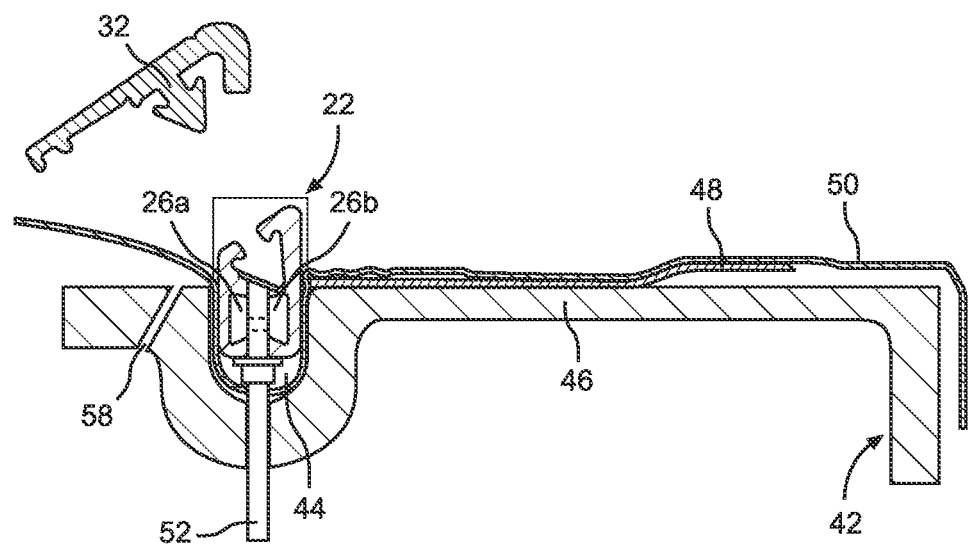
FIG. 8 is a cross-sectional view-not to scale of a first part of the two-part bag seal of FIGS. 2-3 inserted into a flange groove of a mold for an infusion molding process.

With reference to FIGS. 2-5, there is illustrated, perspective views and cross-sectional views of a two-part bag seal 20 according to an embodiment of the disclosure. The two-part bag seal 20 includes an elongate first seal part 22 having a cross-sectional portion 24 enclosing a chamber, such as chambers 26a and 26b therein, and an angled cross-sectional portion 28 having an open receptacle channel 30 therein. The cross-sectional portion 24 enclosing the chamber may have a variety of cross-sectional shapes, including but not limited to, rectangular (FIGS. 3-5), triangular (FIG. 6), and circular or oval (FIG. 7). An elongate second seal part 32 is provided and has a flexible wing portion 34 and a flexible prong 36 distal from the flexible wing portion 34, wherein the flexible prong 36 is engageable with the open receptacle channel 30 of the elongate first seal part 22 as shown in FIG. 2. In some embodiments, the flexible prong 36 has an arrowhead cross-sectional shape and the open receptacle channel 30 likewise has an arrowhead cross-sectional shape so that the flexible prong 36 is tightly engaged with the open receptacle channel 30. In some embodiments, a flexible hook-shaped end 38 is provided adjacent to the flexible prong 36 for engaging the angled cross-sectional portion 28 of the elongate first seal part 22. In some embodiments, the flexible wing portion 34 of the elongate second seal part 32 includes one or more flexible nubs 40 thereon for engaging the flange of a mold as described in more detail below.

The two-part bag mold 20 is made of an elastomeric material selected from natural and synthetic rubbers having a durometer ranging from about 40 to about 60 Shore A hardness according to ASTM D2240. The selected material for the two-part bag seal is preferably a material which has sufficient elasticity that when pressurized will stretch and form a seal about a substrate which does not necessarily meet exacting tolerance specifications and which may contain grooves and indentations. Furthermore, such a seal material must be of sufficient strength to withstand the pressures and temperatures used in the infusion molding process. Elastomeric materials well known to those skilled in the art which may meet the particular requirements for the seal include, but are not limited to, epichlorohydrin, fluoroelastomer, natural rubbers, ethylene and propylene, neoprene, butyl, nitrile-, silicone-based elastomers, ethylene/propylene diene monomer (EPDM) based elastomers, and the like. Any of the foregoing elastomers may be reinforced with a suitable reinforcing fabric, for example nylon fibers, polyester fibers, aramid fibers, or polyamide fibers. In some embodiments, the two-part bag seal 20 is made from a fiber-reinforced elastomer such as a nylon-reinforced silicone rubber.

Figure 9:
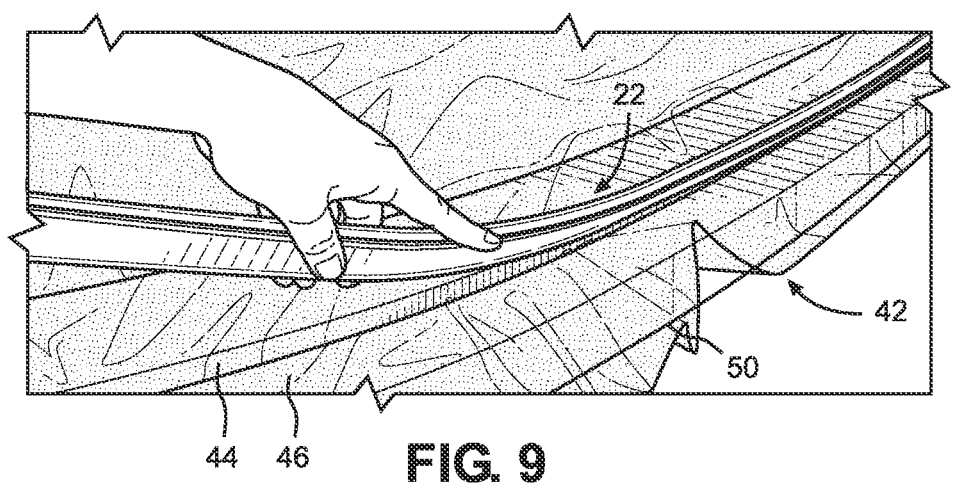
FIG. 9 is a perspective view of a portion of the mold and first part of the two-part bag seal being inserted into a flange groove of a mold for an infusion molding process.
Figure 10:
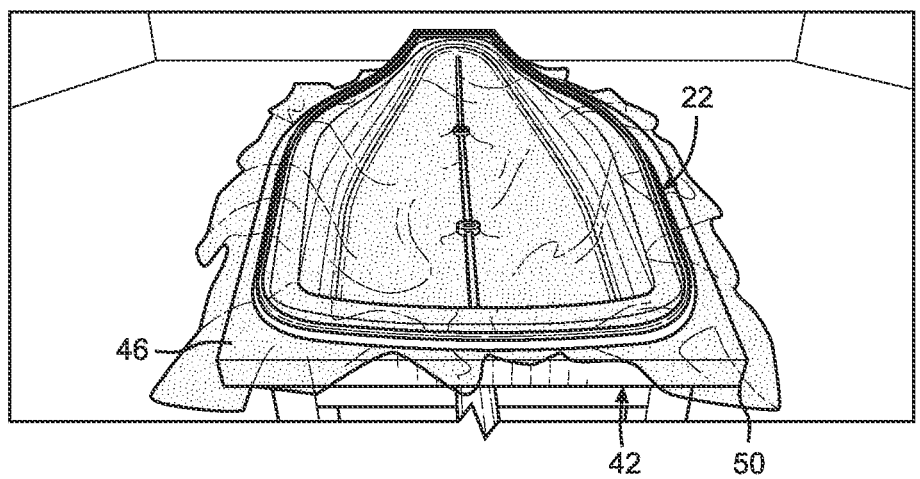
FIG. 10 is a perspective view of a mold for an infusion molding process having the first part of the two-part bag seal installed around the periphery of the mold.

Use of the two-part bag seal 20 is illustrated in FIGS. 8-14. A portion of a mold 42 for use in an infusion molding process is illustrated in a cross-sectional view, not to scale, in FIG. 8. The mold 42 includes a groove 44 in a mold flange 46 of the mold 42 around the periphery thereof. A resin stop material 48 may be used to prevent the resin used to make the infusion molded part from moving past a predetermined area along the mold flange 46. Next a vacuum bag 50 is inserted into the mold 42 and groove 44 of the mold flange 46. The first seal part 22 of the two-part bag seal 20 is inserted into the groove 44 around the entire periphery of the mold 42 as shown in FIGS. 8-10 so that the vacuum bag 50 is between the first seal part 22 and the groove 44 as shown in FIG. 6. The first seal part 22 of the two-part seal 20 includes at least one gas inlet port 52 for pressurizing the chambers 26a and 26b therein. The mold flange 46 of the mold 42 may also include at least one vacuum port 54 (FIG. 14) for pulling a vacuum on the vacuum bag 50 to assist in resin flow within the mold and vacuum bag 50.

Figure 11:
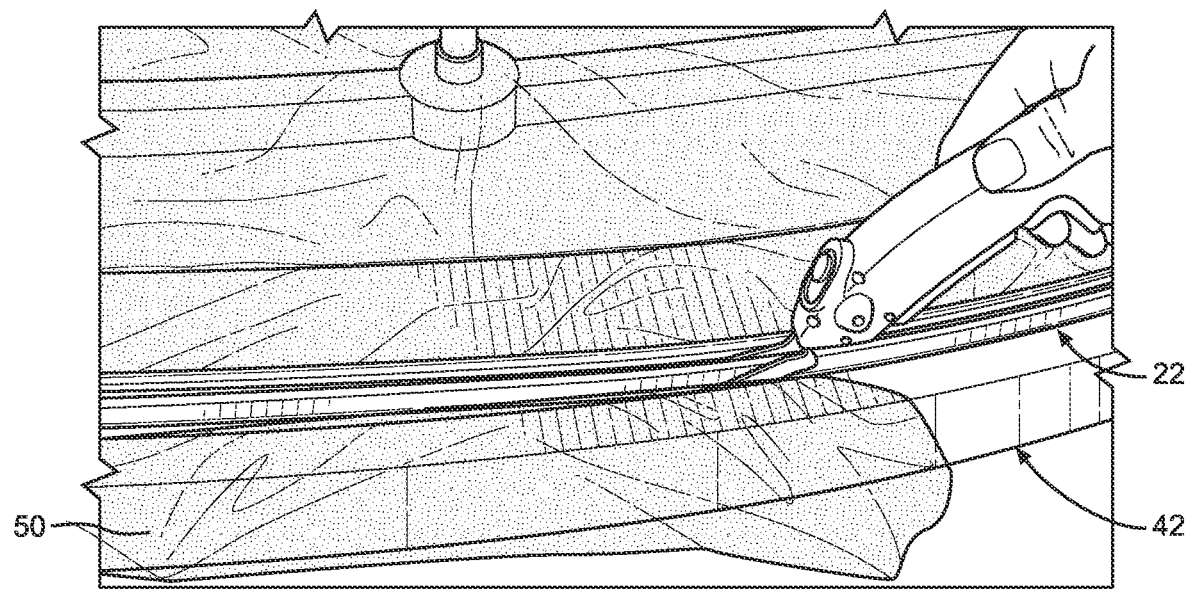
FIGS. 11 and 12 are perspective views of a vacuum bag being cut away from a top side of the flange of a mold used for an infusion molding process.
Figure 12:
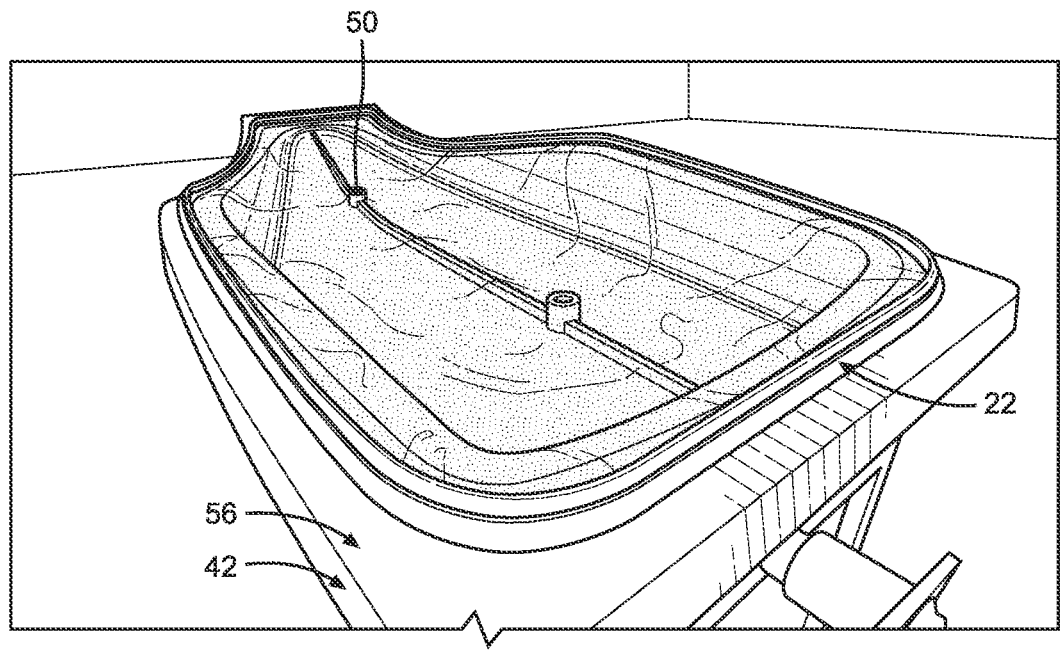
Figure 14:
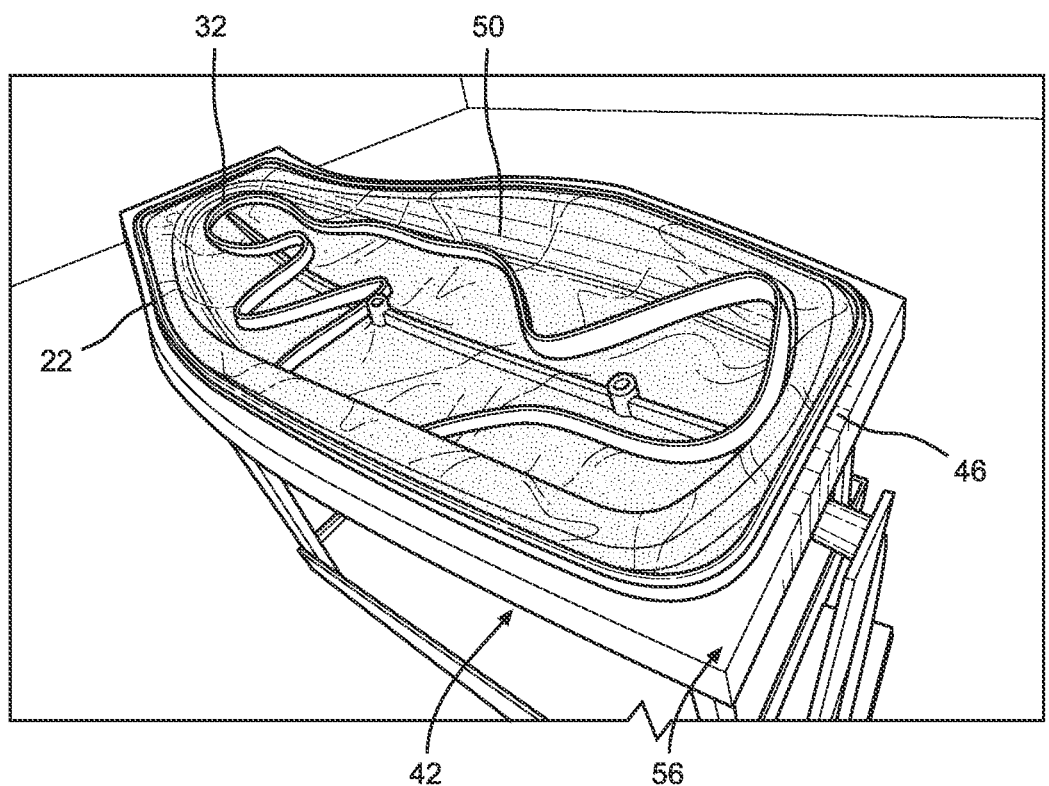
FIGS. 14 and 15 are perspective view of a process for attaching the second part of the two-part bag seal to the first part of the bag seal.
Figure 15:
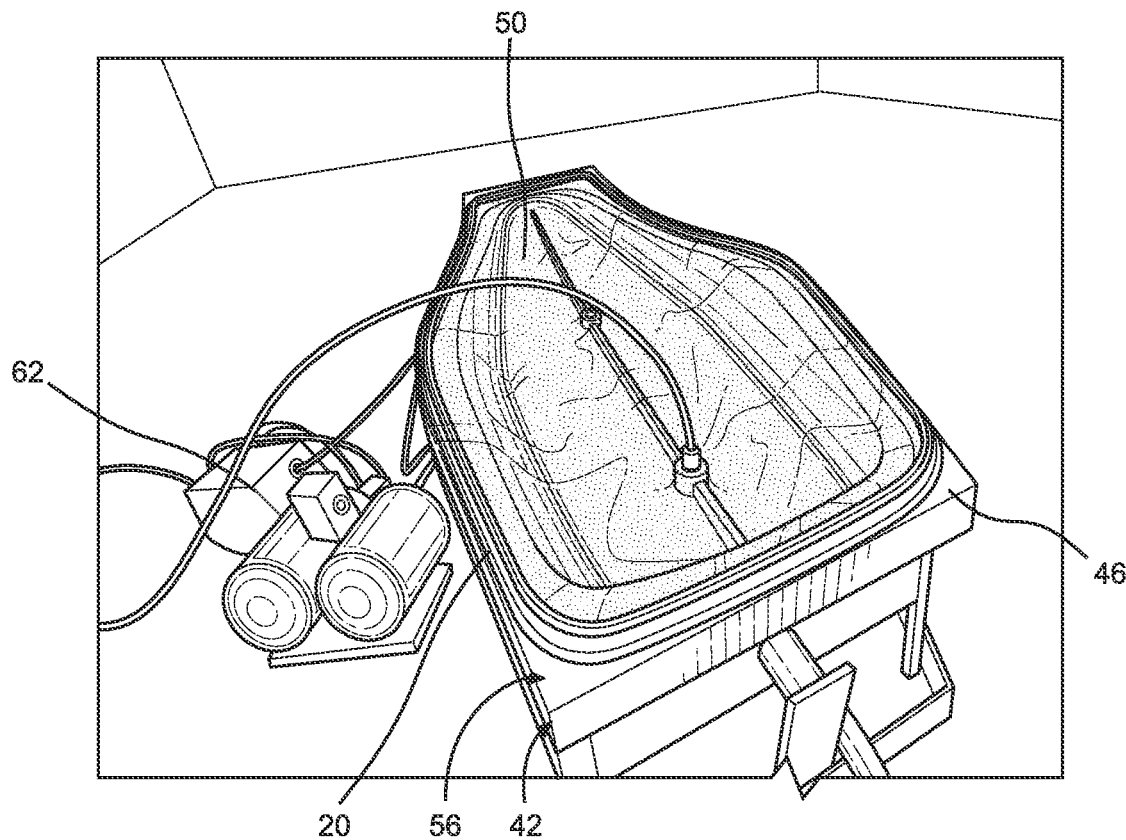

Once the first seal part 22 of the two-part bag seal 20 is in place, the vacuum bag 50 is trimmed around the periphery of the first seal part 22 as shown in FIGS. 11 and 12 to expose a top surface 56 of the mold flange 46 and the first seal part 22 is inflated to expand and engage the vacuum bag 50 tightly against sides of the groove 44. The second seal part 32 is then inserted into the first seal part 22 as shown in FIGS. 13-15.

Figure 13:
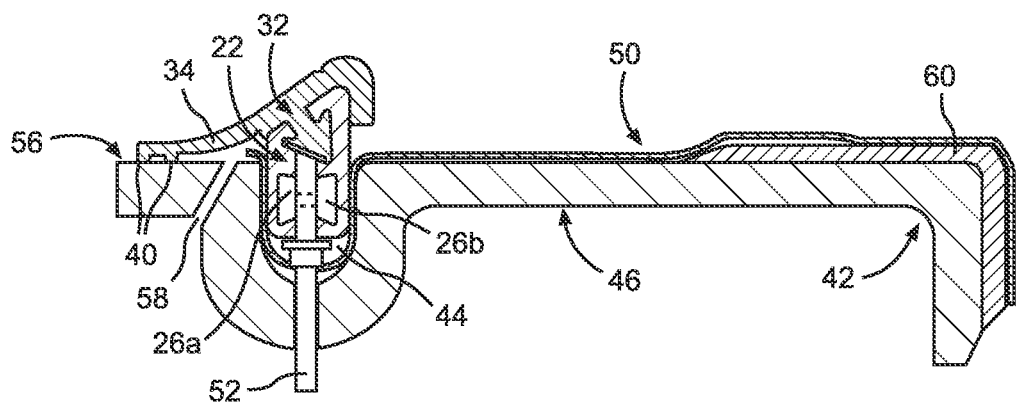
FIG. 13 is a cross-sectional view of a second part of the two-part bag seal of FIGS. 2-3 after the second part is attached to the first part of the bag seal.

As shown in FIG. 13, when the second seal part 32 is engaged with the first seal part 22, the flexible wing portion 34 of the second seal part 32 flexes and sealingly engages the mold flange 46 so that the nubs 40 thereon form a seal with the top surface 56 of the mold flange 46. A second vacuum port 58 may be included in the mold flange 46 so that a vacuum may be applied to remove any air leaking through the nubs 40 on the flexible wing portion 34 of the second seal part 32.

During the infusion molding process, a vacuum is pulled on the vacuum bag 50 using a vacuum pump 62 (FIG. 15) to cause resin to flow within the mold under the vacuum bag.

Figure 16:
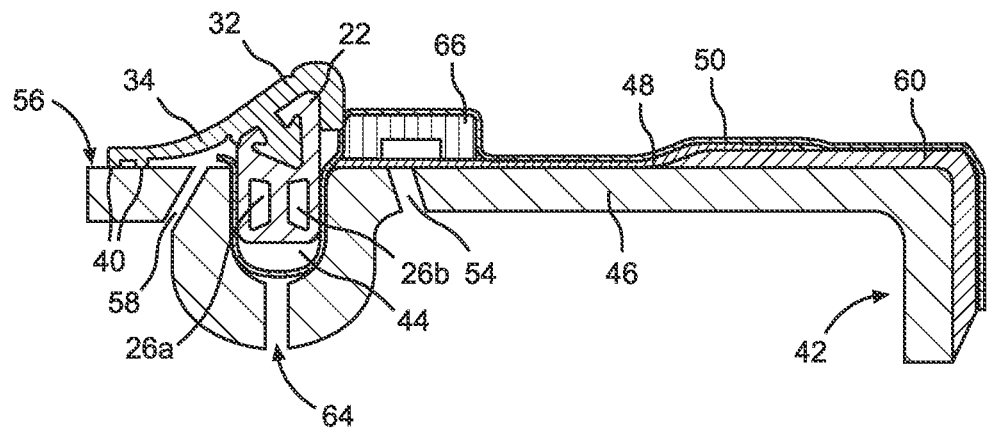
FIG. 16 is a cross-sectional view of the two-part bag seal of FIGS. 2-3 used with an elongate silicon vacuum chamber adjacent to the two-part seal.

In some embodiments, a third vacuum port 64 may be included in the groove 44 of the mold flange 46 to pull a vacuum on the plastic bag 50 in the groove 44 as shown in FIG. 16 (gas inlet port 52 not shown for clarity). In other embodiments, an elongate silicon vacuum channel 66 may be inserted under the vacuum bag 50 adjacent to the groove 44 to assist in pulling a vacuum through the vacuum port 54.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A two-part bag seal configured for infusion molding comprising:
   an elongate first seal part configured for engaging a vacuum bag in a groove of an infusion mold flange, the elongate seal part consisting essentially of a cross-sectional portion enclosing a chamber therein, and an angled cross-sectional portion having an open receptacle channel therein, and
   an elongate second seal part consisting essentially of one flexible wing portion and a flexible prong distal from the one flexible wing portion, wherein the flexible prong is configured to tightly engage with the open receptacle channel of the elongate first seal part and the one flexible wing portion comprises one or more flexible nubs thereon that are configured to seal the flexible wing portion against the infusion mold flange when a vacuum is applied to a first vacuum port in the infusion mold flange between the flexible nubs and the groove in the infusion mold flange.

2. The two-part bag seal of claim 1, wherein the cross-sectional portion comprises at least two chambers therein.

3. The two-part bag seal of claim 1, wherein the open receptacle channel comprises an arrowhead-shaped cross-sectional channel.

4. The two-part bag seal of claim 3, wherein the flexible prong comprises an arrowhead-shaped prong.

5. The two-part bag seal of claim 1, further comprising a flexible hook-shaped end adjacent to the flexible prong configured for engaging the angled cross-sectional portion of the elongate first seal part.

6. The two-part bag seal of claim 1, wherein the one or more flexible nubs are on a same side of the elongate second seal part as the flexible prong.

7. The two-part bag seal of claim 1, further comprising at least one pressure port configured for inflating and expanding the elongate first seal part with a gas to seal the vacuum bag tightly against sides of the groove of the infusion mold flange around a perimeter of the infusion mold.

8. The two-part bag seal of claim 1, wherein the cross-sectional portion enclosing the chamber comprises a rectangular cross-sectional portion.

9. The two-part bag seal of claim 1, wherein the cross-sectional portion enclosing the chamber comprises a circular or oval cross-sectional portion.

10. The two-part bag seal of claim 1, wherein the cross-sectional portion enclosing the chamber comprises a triangular cross-sectional portion.

11. A method for sealing a vacuum bag to a mold for molding of a part, comprising:
    providing a two-part bag seal comprising:
       an elongate first seal part configured for engaging a vacuum bag in a groove of a mold flange of the mold, the elongate seal part consisting essentially of a cross-sectional portion enclosing a chamber therein, and an angled cross-sectional portion having an open receptacle channel therein, and
       an elongate second seal part consisting essentially of a flexible wing portion and a flexible prong distal from the flexible wing portion, wherein the flexible prong is configured to tightly engage with the open receptacle channel of the elongate first seal part and the flexible wing portion is configured to seal against the mold flange;
    inserting the elongate first seal part and a vacuum bag in a groove in the mold flange around a perimeter of the mold;
    inserting the flexible prong of the elongate second seal part into the open receptacle channel of the first seal part; and
    optionally, inflating the chamber of the elongate first seal part with a gas to form an air-tight seal around the perimeter of the mold.

12. The method of claim 11, wherein the elongate second seal part comprises one or more flexible nubs on the flexible wing portion configured for sealing against the mold flange.

13. The method of claim 12, wherein the one or more flexible nubs are on a same side of the elongate second seal part as the flexible prong.

14. The method of claim 13, wherein the mold flange comprises a first vacuum port therein positioned between one or more flexible nubs on the flexible wing portion of the elongate second seal part and the groove in the mold flange, further comprising applying a vacuum to the first vacuum port to seal the flexible wing portion to the mold flange.

15. The method of claim 13, wherein the groove in the mold flange comprises a second vacuum port therein, further comprising applying a vacuum to the second vacuum port to seal the vacuum bag to the mold around the perimeter of the mold.

* * * * *